3,384,488
POLYCHROMATIC PHOTOELECTROPHORETIC IMAGING COMPOSITION
Vsevolod Tulagin, Rochester, and Leonard M. Carreira, Webster, N.Y., assignors to Xerox Corporation, Rochester, N.Y., a corporation of New York
Continuation-in-part of application Ser. No. 384,737, July 23, 1964. This application July 21, 1967, Ser. No. 655,022
14 Claims. (Cl. 96—88)

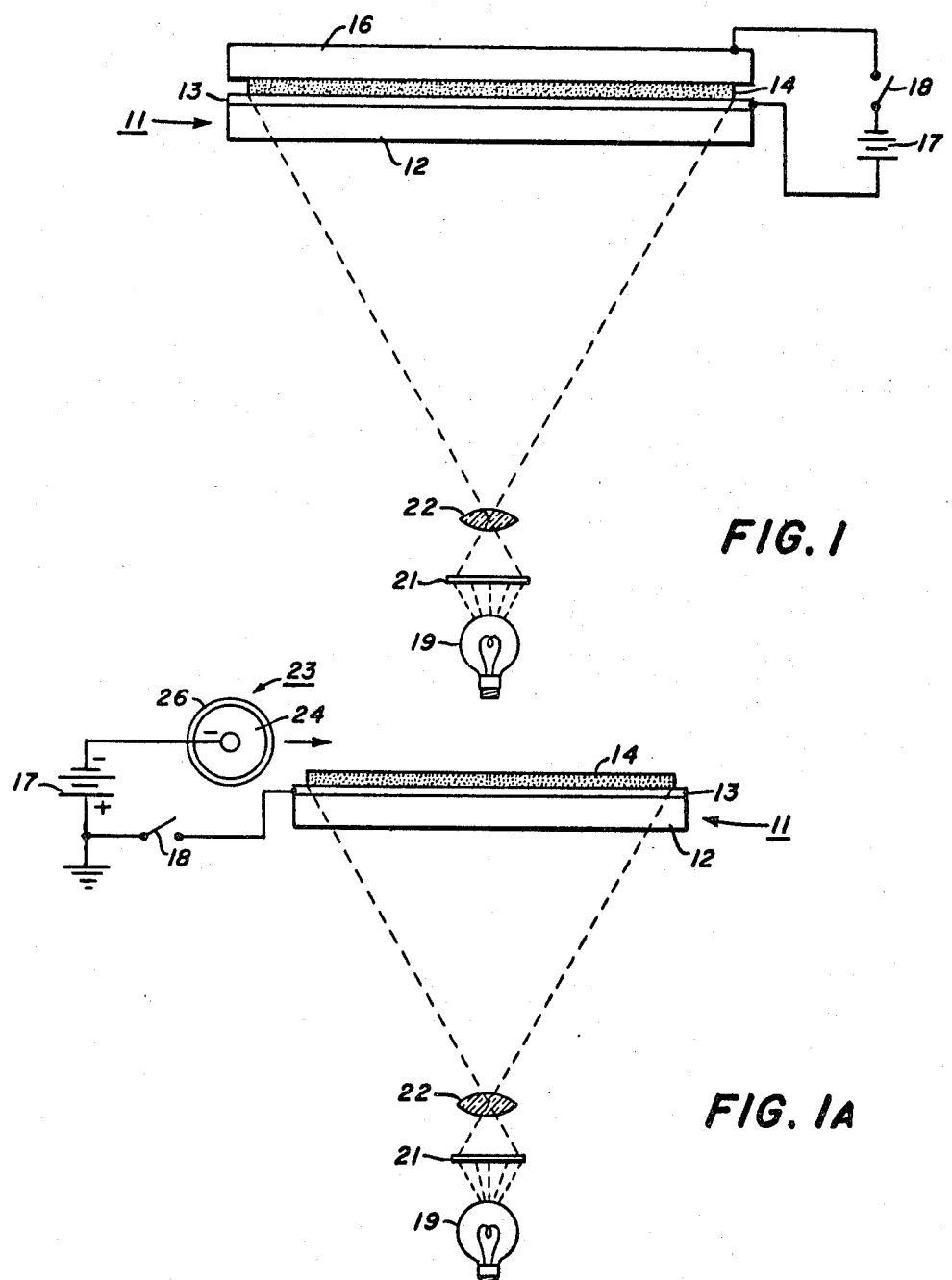

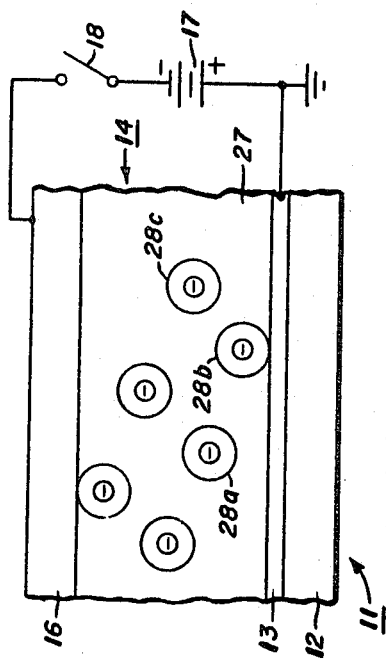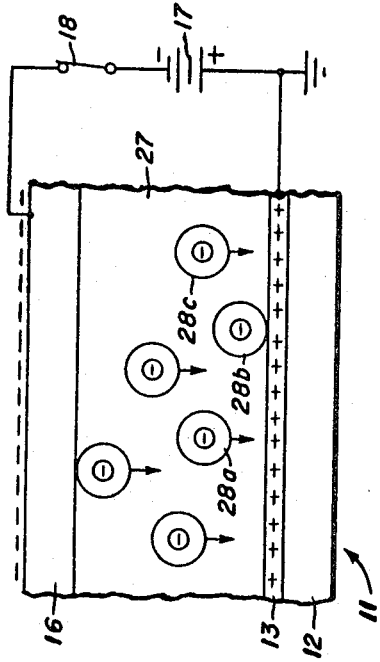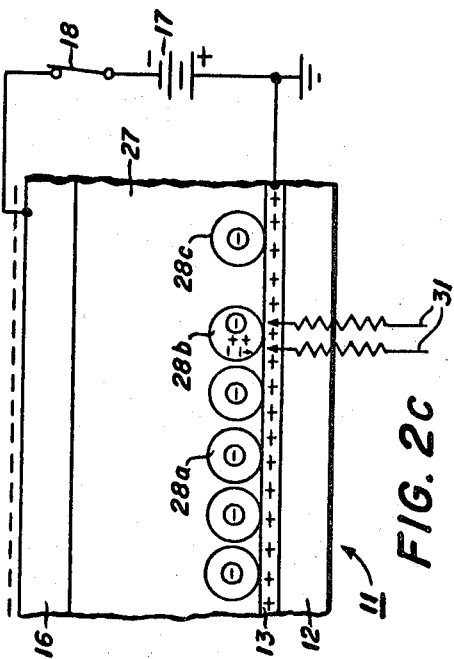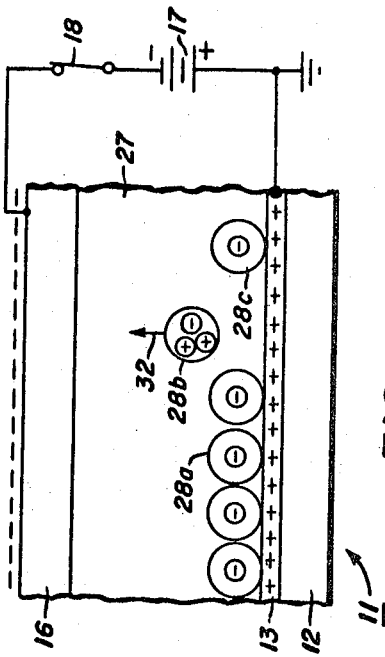

ABSTRACT OF THE DISCLOSURE

An electrophoretic imaging system is described in which a suspension of electrically photosensitive particles in a liquid carrier is placed between a pair of electrodes, one of which is transparent, and the suspension is subjected to an electric field and exposed to an image. A particle image is formed by migration in the suspension on at least one electrode. Where a polychromatic image is desired, the particles have at least two different colors. Each particle comprises a pigment which is both the primary electrically photosensitive ingredient and the primary colorant for the particle.

Background of the invention

This invention relates in general to a novel photoelectrophoretic imaging system and, more specifically, to an imaging material for use in photoelectrophoretic imaging. This application is a continuation-in-part of our copending application, Ser. No. 384,737, filed July 23, 1964.

Although many photographic systems are known today, all suffer from one shortcoming or another. For example, some require expensive and complex initial preparation of the photosensitive media while others suffer from deficiencies in resolution capabilities, photographic speeds, spectral sensitivity and the like. In addition to the aforementioned shortcomings of many of the present-day photographic systems, additional processing is generally required to produce a visible image from the latent image produced on the photosensitive media after its exposure to light.

When present-day photographic systems are employed for the production of color images, the complexity of material and processing steps is further increased to an almost unbelievable extent. Not only are much more complex multi-layer photosensitive recording media required, often times containing as many as seven to nine very thin layers of different material of varying chemical complexity but, in addition, processing of the materials requires a great number of additional steps and careful control of each of these steps becomes much more critical than with the ordinary black and white systems.

Now, in accordance with the present invention, there is described an imaging system in which variously colored light absorbing particles which are believed to bear a charge when suspended in a nonconductive liquid carrier are supended in such a liquid, placed in an electroded system with a voltage applied and exposed to an image. When these steps are completed, particle migration takes place in image configuration providing a visible image at one or both of the electrodes. The system employs as the principal component of the particles intensely colored pigments which are themselves electrically photosensitive and which apparently undergo a net change in charge polarity upon exposure to activating electromagnetic radiation by interaction with one of the electrodes. No other photosensitive elements or materials are required, making for a very simple and inexpensive imaging technique. The images are produced in color because mixtures of two or more differently colored particles which are each sensitive only to light of a specific different wavelength or narrow range of wavelengths are used. It has been found that the particles respond in the regions of the spectrum of their principal light absorption, with the cyan, magenta and yellow particles responding to red, green, and blue light, respectively. Obviously, this makes the system the most basic and ideal possible for subtractive color synthesis.

Although color imaging systems based on particle migration techniques have been suggested in the prior art as described in U.S. Patent 2,940,847 to Kaprelian, these systems have proven so light insensitive and deficient in color rendition and employ such difficult to manufacture imaging particles that they have never been accepted commercially. This situation resulted because the prior art particles employed conventional photoconductors having for the most part relatively wide (even panchromatic) spectral response or photoconductors dye-sensitized to this condition regardless of the color of the photoconductor and then have superimposed at least one additional colored layer over the photoconductor. This colored layer is used to provide a light filtering action, thus making the particle spectrally selective in its response and imparting the proper color to the particle. Although some prior art particles included additional layers of materials, even the simplest particles produce poor results because the two functions of the colored layer are incompatible and, at best, their characteristics must be selected by compromise. On the one hand, the layer should have high optical density to act as a good final image colorant while on the other hand, high density tends to decrease even further the light transmission efficiency of the layer as a filter. In the system of the present invention, it has now been found, quite unexpectedly and surprisingly, that with a large number of photosensitive pigment particles such filter layers are completely unnecessary and are, in fact, undesirable because they reduce system sensitivity. Instead, it has been found that the natural selective spectral light absorption which imparts the appearance of color to each of the differently colored particles also serves to cause them to move in the imaging system of the invention.

Summary of the invention

Accordingly, it is an object of this invention to define a novel and extremely uncomplicated imaging system.

An additional object of the invention is to define a novel imaging system capable of direct positive imaging.

Another object of this invention is to provide an imaging composition capable of producing images in at least two colors.

Still another object of this invention is to provide an imaging composition capable of producing images in full, natural color.

Brief description of the drawings

The above and still further objects, features, and advantages of the present invention will become apparent upon consideration of the following detailed disclosure of the invention, especially when taken in conjunction with the accompanying drawings where:

FIGS. 1 and 1a are side views of simple exemplary systems for carrying out the steps of the invention;

FIGS. 2a, 2b, 2c, and 2d are broken side diagrammatic views of consecutive occurrences which take place during the operation of the imaging process.

The sizes and shapes of elements of the drawings should not be considered as actual sizes or even proportional to actual sizes because many elements have been purposely distorted in size or shape in order to more fully and clearly describe the invention.

Referring now to FIGURE 1, there is seen a transparent electrode generally designated 11 which, in this exemplary instance, is made up of a layer of optically transparent glass 12 overcoated with a thin optically transparent layer 13 of tin oxide, commercially available under the name NESA glass. This electrode shall hereafter be referred to as the "injecting electrode." Coated on the surface of injecting electrode 11 is a thin layer of finely divided electrically photosensitive particles dispersed in an insulating liquid carrier. During this initial part of the description of the invention, the term "electrically photosensitive" may be thought of as any particle which, once attracted to the injecting electrode will migrate away from it under the influence of an applied electric field when it is exposed to actinic electromagnetic radiation; however, a detailed theoretical explanation of the apparent mechanism of operation of the invention is given below. The liquid suspension 14 may also contain a sensitizer and/or a binder for the pigment particles which is at least partially soluble in the suspending or carrier liquid as will be explained in greater detail hereinafter. Above the liquid suspension 14 is a second electrode 16 which is connected to one side of the potential source 17 through a switch 18. The opposite side of potential source 17 is connected to the injecting electrode 11 so that when switch 18 is closed an electric field is applied across the liquid suspension 14 from electrodes 11 and 16. An image projector made up of a light source 19, a transparency 21, and a lens 22 is provided to expose the dispersion 14 to a light image of the original transparency 21 to be reproduced. It should be noted at this point that injecting electrode 11 need not necessarily be optically transparent but that instead electrode 16 may be optically transparent and exposure may be made through it from above as seen in FIGURE 1.

The embodiment shown in FIGURE 1a uses identical numerals to identify indentical parts of the device and is similar to the FIGURE 1 embodiment of the invention except for the fact that electrode 16 is made in the form of a roller 23 having a conductive central core 24 connected to the potential source 17. The core is covered with a layer of a blocking electrode material 26, which may be baryta paper. In both the FIGURE 1 and FIGURE 1a embodiments of the invention, the suspension is exposed to the image to be reproduced while potential is applied across the blocking and injecting electrodes by closing switch 18. In the FIGURE 1a embodiment of the invention, roller 23 is caused to roll across the top surface of injecting electrode 11 with switch 18 closed during the period of image exposure. This light exposure causes exposed particles originally attracted to electrode 11 to migrate through the liquid and adhere to the surface of the blocking electrode, leaving behind a particulate image on the injecting electrode surface which is a duplicate of the original transparency 21. In the FIGURE 1 embodiment of the invention, the blocking electrode 16 may then be removed from the surface of the pigment suspension 14 whereupon the relatively volatile carrier liquid evaporates off leaving behind the image. This image may then be fixed in place as, for example, by placing a lamination over its top surface or by virtue of a dissolved binder material in the carrier liquid such a paraffin wax or other suitable binders that come out of solution as the carrier liquid evaporates. About 3–6% by weight of paraffin binder in the carrier has been found to produce good results. The carrier liquid itself may be molten paraffin wax or other suitable binder in a liquid state which is self-fixing upon cooling and return to the solid state. In the alternative, the particulate image remaining on the injecting electrode may be transferred to another surface and fixed thereon. As explained in greater detail below, the system can produce either monochromatic or polychromatic images depending upon the type and number of pigments suspended in the carrier liquid and the color of light to which the suspension is exposed in the process.

FIGURES 2a through 2d show in detail a proposed theoretical operating mechanism for the system with the pigment particle size and carrier liquid thickness greatly exaggerated for purposes of illustration. Since the system has been experimentally shown to be operative, there is, of course, no intention to limit the invention to this theory of operation which is only given to clarify it. In these figures, like numerals have been used to identify parts of the system which are identical with those in FIGURES 1 and 1a. Referring now to FIGURE 2a, it is seen that the dispersion generally identified as 14 consists of the substantially insulating carrier liquid 27 having charged particles 28a, 28b, 28c, etc. suspended therein. The particles 28 bear a net electrostic charge when suspended in the carrier liquid 27 which is believed to be related to the triboelectric relationship of the particles and liquid. The charges are trapped or bound either within the body of the particles or at their surfaces. The net charge on the particles may be either positive or negative; however, in this instance, an encircled negative charge in each particle has been employed to diagrammatically indicate that trapped negative charge carriers give that particular particle a net negative electrostatic charge. When switch 18 is left in the open condition and no potential is applied across electrodes 11 and 16 in the system as seen in FIGURE 2a, the suspended particles 28 merely assume random positions in the liquid carrier 27. However, when switch 18 is closed, thereby rendering the conductive surface 13 of electrode 11 positive with respect to the back surface of blocking electrode 16, negatively charged particles within the system tend to move toward electrode 11 while any positively charged particles in the system would move toward blocking electrode 16. The existence of any positively charged particles within the system and their movement therein will temporarily be disregarded so as to facilitate the explanation of the movement of negatively charged particles in the carrier liquid. Since the particles 28 are, in the absence of actinic radiation, nonconductive, they come down into contact with or closely adjacent to injecting electrode 11 and remain in that position under the influence of the applied electric field until they are subjected to exposure by activating electromagnetic radiation. In effect then, these particles are bound at the surface of the injecting electrode 11 until exposure takes place, because particles 28 are sufficiently nonconductive in the suspension in their unexposed condition to prevent the injection of positive charge from the surface 13 of the electrode 11 into them. Particles bound on the surface 13 make up the potential imaging particles for the final image to be reproduced thereon.

When photons of light such as 31 in FIGURE 2c are produced as, for example, by the projector which exposes the system to the image being reproduced, they are absorbed by the electrically photosensitive particle 28b and "create" hole-electron pairs on charge carriers within the particle by raising them to a conductive energy band. Since the charge carriers are newly formed by the photons of light 31, as shown in FIGURE 2c, they have not had a chance to become trapped in charge traps within the body of the particle 28b as was the encircled negative charge carrier. Accordingly, these newly formed charge carriers may be considered as mobile in nature and have been represented by unencircled plus and minus signs. Since an electric field is applied across the particles by the potential applied across electrode 16 and conductive surface 13 of electrode 11, the hole-electron pairs created within these particles are caused to separate before they can recombine, with negative charge carriers moving towards surface 13 while positive charge carriers move up toward electrode 16. Since the charge carriers as initially formed are in a mobile condition, the negative charge carriers near the particle-electrode interface can move across the very short distance out of the particle 28b to the surface 13 as indicated by the small arrow, leaving the particle with a net positive charge. Since particle 28b now carriers a net positive charge, it is repelled away by the positive surface 13 of electrode 11 and attracted to negative blocking electrode 16, moving as indicated by arrow 32 in FIGURE 2d. Accordingly, all particles such as 28b on the surface 13 which are exposed to electromagnetic radiation of a wavelength to which they are sensitive (that is to say, a wavelength which will cause the formation of hole-electron pairs within the particles) move away from surface 13 up to the surface of electrode 16, leaving behind those particles such as 28c which are either not exposed at all or not exposed to electromagnetic radiation to which they are sensitive. Consequently, if all particles in the system are sensitive to one wavelength of light or another and the system is exposed to an image with white light, a positive image will be formed on the surface of electrode 13 by the subtraction of bound particles from its surface in exposed areas leaving behind bound particles in unexposed areas. The system is also capable of creating a photographically negative image on surface 16 since only particles in exposed areas move up to that surface. As particles such as 28b move up through the liquid carrier 27 from surface 13 towards electrode 16, it is believed that the new charge carriers enter charge carrier traps and this has been indicated diagrammatically by showing the holes enclosed within circles in FIGURE 2d. Accordingly, the particle now contains one trapped electron and two trapped holes giving it a net charge of plus 1.

As should be clear at this point in the disclosure, there are certain preferred properties for electrodes 11 and 16. These are that electrode 11 will preferably be capable of accepting injected electrons from bound particle 28b when it is exposed to light so as to allow for a net change in the charge polarity on the particle and that electrode 16 will preferably be a blocking electrode which is incapable of injecting electrons into particle 28b at more than a very slow rate when it comes into contact with the surface of the electrode 16. Obviously, if all polarities in the systems are reversed, electrode 11 will preferably be capable of accepting injected holes from bound particles upon exposure to light and electrode 16 would preferably be a blocking electrode incapable of injecting holes into the particles at more than a very slow rate when they come into contact with the surface of this electrode. In this preferred embodiment, electrode 11 may be composed not only of conventional conductive materials such as tin oxide, copper, copper iodide, gold or the like but may also include many semiconductive materials such as raw cellophane which are not ordinarily thought of as conductors but which are still capable of accepting injected charge carriers of the proper polarity under the influence of the applied field. Even highly insulating materials such as polytetrafluoroethylene may be placed over the surface of the "injecting" electrode and still be operative because charge which leaves the particles initially bound on this surface upon exposure to light can merely move out of the particles and remain on the insulating surface thereby allowing the exposed particles to migrate. However, the use of the more conductive materials is preferred because it allows for cleaner charge separation in that charge leaving the particles upon exposure can move into the underlying surface and away from the particle in which it originated. This also prevents possible charge buildup on the electrode which might tend to diminish the interelectrode field. On the other hand, the preferred embodiment of the blocking electrode 16 is selected so as to prevent or greatly retard the injection of electrons (or holes, depending upon the initial polarity of charge on the particle) into particle 28b when it reaches the surface of this electrode. Accordingly, the surface of this electrode facing carrier liquid 27 in the preferred embodiment may be either an insulator or a semiconductor which will not allow for the passage of sufficient charge carriers under the influence of the applied field to discharge the particles finally bound to it, thereby preventing particle oscillation in the system. Even if this blocking electrode will allow for the passage of some charge carriers through it to the particles, it will still be considered to come within the class of preferred materials if it does not allow for the passage of sufficient carriers to recharge the particle to the opposite polarity because even a discharged particle will tend to adhere to this blocking electrode by Van der Waals forces. Here again, materials not coming within the preferred class may be employed but they tend to lead to particle oscillation in the system, resulting in lower image density, poorer image resolution image reversal and similar deficiences, with the degree of these deficiencies, in most instances depending upon how far the material employed deviates from the preferred class of materials in its electrical characteristics. Baryta paper and other suitable materials may be employed to surface the blocking electrode and may be wet on their back surfaces with tap water or coated on these back surfaces with electrically conductive materials. Baryta paper consists of a paper coated with barium sulfate suspended in a gelatin solution. The terms "blocking electrode" and "injecting electrode" should be understood and interpreted in this context throughout the specification and claims. As described in greater detail hereinafter, the system may be operated with suspensions of particles which initially take on a net positive charge, or a net negative charge, and even with systems where the particles in suspensions apparently take on both polarities of charge.

The following saturated hydrocarbons are suitable for use in the system: decane, dodecane, N-tetradecane, molten paraffin, molten beeswax or other molten thermoplastic materials, Sohio Odorless Solvent (a kerosene fraction available from Standard Oil Company of Ohio) and Isopar G (a long chain saturated aliphatic hydrocarbon available from Humble Oil Company of New Jersey) and mixtures thereof. Any other suitable substantially insulating liquid may be used.

A wide range of voltages may be employed between the electrodes in this system. For good image resolution, high image density and low background, it is preferred that the potential applied be such as to create an electrical field of at least about 300 volts per mil across the imaging suspension. The applied potential necessary to attain this field strength will, of course, vary depending upon the interelectrode gap and on the thickness and type of blocking material used on the blocking electrode surface. For the very highest image quality, the optimum field is at least about 2,000 volts per mil. The upper limit of field strength is limited only by the breakdown potential of the suspension and blocking material. Fields below about 300 volts per mil, while capable of producing images, generally produce images of low density and of irregular density across the image.

The field here is found by dividing the inter-electrode gap into the potential applied between the electrodes. The field is assumed to be applied across this gap. Thus, where the two electrodes are spaced about 1 mil apart, a potential of about 300 volts applied between the blocking electrode core and the injecting electrode surface will produce a field across the suspension of about 300 volts per mil.

In this polychromatic system, the particles are selected so that those of different colors respond to different wavelengths in the visible spectrum corresponding to their principal absorption and further so that their spectral response curves do not have substantial overlap, thus allowing for color separation and subtractive multicolor image formation.

For full subtractive color imaging, several different particles are employed, namely, a cyan colored particle sensitive mainly to red light, a magenta colored particle sensitive mainly to green light, and a yellow colored particle sensitive mainly to blue light. While this is the simplest combination, additional particles having different absorption maxima may be added to improve color synthesis. When mixed together in the carrier liquid, these particles produce a black-appearing liquid and when one or more of the particles are caused to migrate from base electrode 11 towards an upper electrode, they leave behind particles which produce a color equivalent to the color of the impinging light source. Thus, for example, red light exposure causes the cyan colored pigment to migrate thereby leaving behind the magenta and yellow pigments which combine to produce red in the final image. In the same manner, blue and green colored light are reproduced by removal of yellow and magenta respectively, and, of course, when white light impinges upon the mix, all pigments migrate leaving behind the color of the white or transparent substrate. No exposure leaves behind all pigments which combine to produce a black image. It should be recognized that this is an ideal technique of subtractive color imaging in that the particles are not only each composed of but one component but, in addition, they perform a dual function in that they act both as the primary image colorant and the primary electrically photosensitive medium of the system. Accordingly, the system represents virtually the ultimate in eliminating the complexity of prior art methods of subtractive color imaging.

It is desirable to use particles which are relatively small in size because smaller particles produce better and more stable pigment dispersions in the liquid carrier and, in addition, are capable of producing images of higher resolution than would be possible with particles of larger sizes. Even where the pigments are not commercially available in small particle sizes, the particle size may be reduced by conventional techniques such as extended ball milling or the like. In general, best results have been obtained with particles having an average diameter of up to about 5 microns. While satisfactory images may be obtained with larger particles, the images tend to be splotchy in appearance and to have low density. For optimum image density and uniformity of density across the image, particles having a diameter up to about 1 micron should be used.

When the particles are suspended in the liquid carrier, they may take on a net electrostatic charge so that they may be attracted towards one of the electrodes in the system depending upon the polarity of this charge with respect to that of the electrodes. It is not necessary that the particles take on only one polarity of charge but instead the particles may be attracted to both electrodes. Some of the particles in the suspension initially move towards the "injecting" electrode while others move towards the "blocking" electrode with this type of system; however, this particle migration takes place uniformly over the whole area covered by the two electrodes and the effect of imagewise, exposure-induced migration is superimposed upon it. Clearly then, the apparent bipolarity of the suspensions in no way adversely affects the imaging capability of the system except for the fact that it subtracts some of the particles uniformly from the system before imagewise modulation of the particle migration takes place. In other words, the above behavior causes a portion of the suspended particles to be removed from the system as potential image formers. The effective subtraction of some of these particles as potential image formers in the system is easily overcome by merely forming an initial suspension of particles containing a sufficiently high particle concentration so that the system is still capable of producing intense images. It also has been found that with some suspensions of this type, either polarity of potential may be applied to the electrodes during imaging.

Although some of the photosensitive pigment materials used in this invention may be used in conventional structures working on a photoconductive principle, it is believed that a different type of electrically photoresponsive mechanism is involved because it has generally been found that spectral response of the materials is much narrower and their sensitivity is much higher when they are used in the liquid carrier structure of this invention than when they are used in other modes involving photoconductive response.

The addition of small amounts (generally ranging from .5 to 5 mol percent) of electron donors or acceptors to the suspensions with the choice depending upon whether the particles attracted to the "injecting" electrode are positive or negative respectively has imparted significant increases in system photosensitivity as described in the examples. This effect is believed to be caused either by the scavenging of free charge carriers from the system or from an initial charge build up on the surface of the particles. For further details of electrically sensitizing this system, see copending application Ser. No. 566,846, filed July 21, 1966.

Any suitable electrically photosensitive particle or mixtures of such particles may be used in carrying out the invention, regardless of whether the particular particle selected is organic, inorganic and is made up of one or more components in solid solution or dispersed one in the other or whether the particles are made up of multiple layers of different materials. Typical organic pigments include: quinacridones such as: 2,9-dimethyl quinacridone, 4,11-dimethyl quinacridone, 2,10-dichloro-6,13-dihydro-quinacridone, 2,9-dimethoxy-6,13-dihydro-quinacridone, 2,4,9,11-tetrachloro-quinacridone, and solid solutions of quinacridones and other compositions as described in U.S. Patent 3,160,510; carboxamides such as:

N-2″-pyridyl-8,13,dioxodinaphtho-(1,2-2′,3′) furan-6-carboxamide,
N-2″-(1″,3″-diazyl)-8,13-dioxodinaphtho-(1,2-2′,3′) furan-6-carboxamide,
N-2″-(1″,3″,5″-triazyl)-8,13-dioxodinaphtho-(1,2-2′,3′) furan-6-carboxamide,
anthra-(2,1,$\beta$)-naphtho-(2,3-d)-furan-9,14-dione-7-(2′-methylphenyl) carboxamide;

carboxanilides such as:

8,13,-dioxodinaphtho-(1,2-2′,3′)-furan-6-carbox-p-methoxy-anilide,
8,13-dioxodinaphtho-(1,2-2′,3′)-furan-6-carbox-p-methylanilide,
8,13-dioxodinaphtho-(1,2-2′,3′)furan-6-carbox-m-chloroanilide,
8,13-dioxodinaphtho-(1,2-2′,3′)-furan-6-carbox-p-cyanoanilide;

triazines such as:

2,4-diamino-triazine,
2,4-di(1′-anthraquinonyl-amino)-6-(1″-pyrenyl)-triazine,
2,4-di(1′-anthraquinonyl-amino)-6-(1″-naphthyl)-triazine,
2,4-di(1′-naphthyl-amino)-6-(1′-perylenyl)-triazine,
2,4,6-tri(1′,1″,1‴-pyrenyl)-triazine;

benzopyrrocolines such as:

2,3-phthaloyl-7,8-benzopyrrocoline,
1-cyano-2,3-phthaloyl-7,8-benzopyrrocoline,
1-cyano-2,3-phthaloyl-5-nitro-7,8-benzopyrrocoline,
1-cyano-2,3-phthaloyl-5-acetamido-7,8-benzopyrrocoline;

anthraquinones such as:

1,5-bis-(beta-phenylethylamino) anthraquinone,
1,5-bis-(3′-methoxypropylamino) anthraquinone,
1,5-bis (benzylamino) anthraquinone,
1,5-bis (phenylbutylamino) anthraquinone,
1,2,5,6-di(C,C′-diphenyl)-thiazoleanthraquinone,
4-(2′-hydroxyphenyl-methoxyamino) anthraquinone;

azo compounds such as:

2,4,6-tris (N-ethyl-N-hydroxy-ethyl-p-aminophenylazo) phloroglucinol,
1,3,5,7-tetrahydroxy-2,4,6,8-tetra (N-methyl-N-hydroxy-ethyl-p-amino-phenylazo) naphthalene,
1,3,5-trihydroxy-2,4,6-tri(3'-nitro-n-methyl-n-hydroxy-methyl-4'-aminophenylazo) benzene,
3-methyl-1-phenyl-4-(3'-pyrenylazo)-2-pyrazolin-5-one,
1-(3'-pyrenylazo)-2-hydroxy-3-naphthanilide,
1-(3'-pyrenylazo)-2-naphthol,
1-(3'-pyrenylazo)-2-hydroxypyrene,
1-(3'-pyrenylazo)-2-hydroxy-3-methyl-xanthene,
2,4,6-tris (3'-pyrenylazo) phloroglucinol,
2,4,6-tris (1'-phenanthrenylazo) phloroglucinol,
1-(2'-methoxy-5'-nitro-phenylazo)-2-hydroxy-3''-nitro-3-naphthanilide;

salts and lakes of compounds derived from 9-phenyl-xanthene, such as: phosphotungstomolybdic lake of 3,6-bis (ethylamino)-9,2'-carboxyphenyl xanthenonium chloride, barium salt of 3-2'-toluidine amino-6-2'-methyl-4''-sulphophenyl-amino-9,2''-carboxyphenyl xanthene; phosphomolybdic lake of 3,6-bis (ethylamino)-2,7-dimethyl-9-2'-carbethoxyphenylxanthenonium chloride; dioxazines such as:

2,9-dibenzoyl-6,13-dichloro-triphenodioxazine,
2,9-diacetyl-6,13-dichloro-triphenodioxazine,
3,10-dibenzoylamino-2,9-diisopropoxy-6,13-dichloro-triphenodioxazine,
2,9-difuroyl-6,13-dichloro-triphenodioxazine;

lakes of fluorescein dyes, such as: lead lake of 2,7-dinitro-4,5-dibromo fluorescein, lead lake of 2,4,5,7-tetrabromo fluorescein, aluminum lake of 2,4,5,7-tetrabromo-10,11,12,13-tetrachloro fluorescein; bisazo compositions such as:

N,N'-di-1-(1'-naphthylazo)-2-hydroxy-8-naphthyl adipdiamide,
N,N'-di-1-(1'-naphthylazo)-2-hydroxy-8-naphthyl succindiamide,
bis-4,4'-(2''-hydroxy-8''-N,N'-diterephthalamide-1-naphthylazo) biphenyl,
3,3'-methoxy-4,4'-diphenyl-bis(1''-azo-2''-hydroxy-3''-naphthanilide);

pyrenes such as: 1,3,6,8-tetracyanopyrene, 1,3-dicyano-6,8-dibromo-pyrene, 1,3,6,8-tetraaminopyrene, 1-cyano-6-nitropyrene; phthalocyanines such as: beta-form metal-free phthalocyanine, copper phthalocyanine, tetrachloro phthalocyanine, the "x-form of metal-free phthalocyanine as described in copending application Ser. No. 505,723, filed Oct. 29, 1965; metal salts and lakes of azo dyes, such as: calcium lake of 6-bromo-1(1'-sulfo-2-naphthylazo)-2-naphthol, barium salt of 6-cyano-1(1'-sulfo-2-naphthylazo)-2-naphthol, calcium lake of 1-(2'-azonaphthalene-1'-sulfonic acid) - 2 - naphthol, calcium lake of 1-(4'-ethyl-5'-chloroazobenzene-2'-sulfonic acid)-2-hydroxy-3-naphthoic acid; and mixtures thereof.

Typical inorganic compositions include cadmium sulfide, cadmium sulfoselenide, zinc oxide, zinc sulfide, sulphur selenium, mercuric sulfide, lead oxide, lead sulfide, cadmium selenide titanium dioxide, indium trioxide and the like.

In addition to the aforementioned organic pigments other organic materials which may be employed in the particles include polyvinylcarbazole;
2,4-bis(4,4'-diethyl-aminophenyl)-1,3,4-oxidiazole;
N-isopropylcarbazole;
polyvinylanthracene;
triphenylpyrrol;
4,5-diphenylimidazolidinone;
4,5-diphenylimidazolidinethione;
4,5-bis-(4'-amino-phenyl)-imidazolidinone;
1,2,5,6-tetraazacyclooctatetraene-(2,4,6,8);
3,4-di-(4'-methoxyphenyl)7,8-diphenyl-1,2,5,6-tetraaza-cyclooctatetraene-(2,4,6,8);
3,4-di(4'-phenoxy-phenyl)-7,8-diphenyl-1,2,5,6-tetraaza-cyclooctatetraene-(2,4,6,8);
3,4,7,8-tetramethoxy-1,2,5,6-tetraaza-cyclooctatetraene-(2,4,6,8).
2-mercapto-benzthiazole;
2-phenyl-4-alpha-naphthylidene-oxazolone;
2-phenyl-4-diphenylidene-oxazolone;
2-phenyl-4-p-methoxybenzylidene-oxazolone;
6-hydroxy-2-phenyl(p-dimethyl-amino phenyl) benzofurane;
6-hydroxy-2,3-di(p-methoxyphenyl)-benzofurane;
2,3,5,6-tetra-(p-methoxyphenyl)-furo-(3,2f)-benzo furane;
4-dimethylamino-benzylidene-benzhydrazide;
4-dimethyl-aminobenzylideneisonicotinic acid hydrazide;
furfurylidene-(2)-4'-dimethylamino-benzhydrazide;
5-benzilidene-amino-acenaphthene-3-benzylidene-amino-carbazole;
(4-N,N-dimethylamino-benzylidene)-p-N,N-dimethyl-aminoaniline;
(2-nitro-benzylidene)-p-bromo-aniline;
N,N-dimethyl-N'-(2-nitro-4-cyano-benzylidene)-p-phenylene-diamine;
2,4-diphenyl-quinazoline;
2-(4'-amino-phenyl)-4-phenyl-quinazoline;
2-phenyl-4-(4'-dimethyl-amino-phenyl)-7-methoxy-quinazoline;
1,3-diphenyl-tetra-hydroimidazole;
1,3-di-(4'-chlorophenyl)-tetra-hydroimidazole;
1,3-diphenyl-2-4'-dimethyl aminophenyl)-tetra-hydro-imidazole;
1,3-di-(p-tolyl)-2-[quinonyl-(2')]-tetrahydroimidazole;
3-(4'-dimethylamino-phenyl)-5-(4'-methoxy-phenyl)-6-phenyl-1,2,4-triazine;
3-pyridil-(4')-5-(4'-dimethylaminophenyl)-6-phenyl-1,2,4-triazine;
3-(4'-amino-phenyl)-5,6-di-phenyl-1,2,4-triazine;
2,5-bis[4'-amino-phenyl-(1')]-1,3,3-triazole;
2,5-bis [4'-(N-ethyl-N-acetyl-amino)-phenyl-(1')]-1,3,4-triazole;
1,5-diphenyl-3-methyl-pyrazoline;
1,3,4,5-tetraphenyl-pyrazoline;
1-phenyl-3-(p-methoxy styryl)-5-(p-methoxy-phenyl)-pyrazoline;
1-methyl-2-(3',4'-dihydroxy-methylene-phenyl)-benzimidazole;
2-(4'-dimethylamine phenyl)-benzoxazole;
2-(4'-methoxyphenyl)-benzthiazole;
2,5-bis [p-amino-phenyl-(1)]-1,3,4-oxidiazole;
4,5-diphenyl-imidazolone;
3-amino-carbazole;

copolymers and mixtures thereof.

Other materials include organic donor-acceptor (Lewis acid-Lewis base) charge-transfer complexes made up of aromatic donor resins such as phenolaldehyde resins, phenoxies, epoxies, polycarbonates, urethanes, styrene or the like complexed with electron acceptors such as 2,4,7-trinitro - 9 - fluoroenone; 2,4,5,7 - tetranitro - 9 - fluorenone; picric acid; 1,3,5-trinitro benzene; chloranil; 2,5-dichloro-benzoquinone; anthraquinone-2-carboxylic acid, 4-nitro-phenol; maleic anhydride; metal halides of the metals and metalloids of Groups I–B and II–VIII of the Periodic Table including for example, aluminum chloride, zinc chloride, ferric chloride, magnesium chloride, calcium iodide, strontium bromide, chromic bromide, arsenic triiodide, magnesium bromide, stannous chloride etc.; boron halides, such as boron trifluorides; ketones such as benzophenone and anisil, mineral acids such as sulfuric acid; organic carboxylic acids such as acetic acid and maleic acid, succinic acid, citroconic acid, sulphonic acid, such as 4-toluene sulphonic acid and mixtures thereof. In addition to the charge transfer complexes, it is to be noted that many other of the above materials may be further sensitized by the charge transfer complexing technique and that many of these materials may be dye-sensitized to narrow, broaden or heighten their spectral response curves.

As stated above, any suitable particle structure may be employed. Typical particles include those which are made up of only the pure photosensitive material or a sensitized form thereof, solid solutions or dispersions of the photosensitive material in a matrix such as thermoplastic or thermosetting resins, copolymers of photosensitive pigments and organic monomers, multilayers of particles in which the photosensitive material is included in one of the layers and where other layers provide light filtering action in an outer layer or a fusable or solvent softenable core of resin or a core of liquid such as dye or other marking material or a core of one photosensitive material coated with an overlayer of another photosensitive material to achieve broadened spectral response. Other photosensitive structures include solutions, dispersions, or copolymers of one photosensitive material in another with or without other photosensitively inert materials.

While the above structural and compositional variations are useful, it is preferred that each particle be primarily composed of an electrically photosensitive pigment, such as those listed above, wherein the pigment is both the primary electrically photosensitive ingredient and the primary colorant for the particle. These particles have been found to give optimum photographic sensitivity and highest overall image quality in addition to being simple and economical to prepare. Of course, it may often be desirable to include other ingredients, such as spectral or electrical sensitizers or secondary colorants and secondary electrically photosensitive materials.

In an especially preferred form of the imaging process, the electrode to which the imaging particles are caused to migrate is repeatedly brought into contact with the particle suspension during the continued application of potential and image exposure with cleaning of the electrode between each contact. This technique has been found to produce a significant improvement in the color balance of the image produced and to generally improve the faithfulness of color rendition of the system. Three to eight repetitions of the contact has generally proven to porduce results which cannot be further improved by further processing. The improved form of imaging process may be carried by merely re-rolling electrode 23, shown in FIGURE 1a, over the particle suspension the desired number of times between passes as with a cleaning brush in contact with the upper surface of it or by manual cleaning. Four to seven passes of the roller in this mode produce good results. As stated above, once the particle image is formed on one of the electrodes, it may be fixed thereon as by spraying a binder on it, laminating an overlay on it or by including a binder in solution in the liquid suspending medium. In most instances, however, it will be found preferable to transfer the image from the electrode and fix it on another surface so that the electrode may be reused. Such a transfer step may be carried out by adhesive pickoff with an adhesive tape, such as Scotch brand cellophane tape or preferably by electrostatic field transfer. Electrostatic transfer may, for example, be carried out by carrying out the imaging procedure described in connection with FIGURE 1a and then passing a second roller over the particle image formed on electrode 11 held at a potential opposite in polarity to that of first electrode. If the second electrode roller is covered with baryta paper sleeve, this paper sleeve will pick up the complete image as the electrode rolls over it. For further details on this transfer system, see copending application Ser. No. 542,050, filed Apr. 12, 1966.

Although various electrode spacings may be employed, spacings of less than 1 mil and extending down even to the point where the electrodes are pressed together, as in the case of the roller electrode of FIGURE 1a, constitute a particularly preferred form of the invention in that they produce better image density and background. Wider spacings then these spacings tend to result in high background.

Any suitable proportion of electrically photosensitive particles to carrier liquid may be used. It is preferred that from about 2 to about 10 weight percent particles be used for good balance between high image density and low background, consistent with particle economy. Less than 2 wt. percent particles tend to cause streaky images, while over 10 wt. percent particles tend to cause mottling in the image. Optimum image quality has been obtained with from about 5 to 6 weight percent particles.

The layer of the imaging suspension may be coated onto either electrode before imaging. Generally, the layer should have a thickness about 2 mils greater than the inter-electrode spacing to insure that both electrodes uniformly contact the suspension. Still greater relative layer thicknesses may be used, since the excess is merely squeezed out as the electrodes are brought into place. However, this excess is not needed for imaging and is uneconomical. Where the inter-electrode spacing is up to 1 mil, optimum results are obtained with a suspension layer thickness of 0.5 to 3 mils.

DESCRIPTION OF PREFERRED EMBODIMENTS

The following illustrative examples are given to enable those skilled in the art to more clearly understand and practice the invention with Examples I–XXX defining the spectral response of a number of single pigment suspensions and modified suspensions and the following examples illustrating how selected pigments may be combined to make a color imaging mix. These examples may be considered to illustrate preferred embodiments of the present system. All parts and percentages are by weight unless otherwise indicated.

Example I–XXX

Each of these examples is carried out in an apparatus of the general type schematically illustrated in FIGURE 1a with the imaging mix coated on a NESA glass substrate through which exposure is made. The NESA glass surface is connected in series with a switch, a potential source, and the conductive center of a roller having a coating of baryta paper on its surface. The roller is approximately 2.5 inches in diameter and is moved across the plate surface at about 1.5 centimeters per second. The place employed is roughly 3 inches square and is exposed with a light intensity of about 1800 foot-candles. About 7 percent by weight of the indicated finely divided photosensitive material in each example is suspended in Sohio Odorless Solvent 3440. During imaging, unless otherwise indicated, a positive potential of about 2500 volts is imposed on the core of the roller. The gap between the baryta paper surface and the NESA glass surface is about 1 mil. With all pigments which are received commercially with a relatively large particle size, the particles are ground in a ball mill for about 48 hours to reduce their size to an average diameter of less than 1 micron. Exposure is made with a 3200° K. lamp through a 0.30 neutral density step wedge filter to measure the sensitivity of the suspension to white light and then Wratton filters 29, 61 and 47b are individually superimposed over the light source in separate runs to measure the sensitivity of the suspension to red, green, and blue light, respectively. The relative sensitivity response figures obtained for the suspension are tabulated in Table 1 below. The sensitivity figures are derived from the number of step wedge filter steps which are discernible in the image made through the filter. Thus, where one step is visible in the image, sensitivity is one; where two are visible, it is two; where three are visible, it is four; where four are visible, it is eight, etc.

In addition to the sensitivity tests, each of the compositions listed below is suspended in the carrier liquid and exposed to a conventional black-and-white transparency containing line copy images using white light. Each of the compositions listed below produces an image of good quality, with a positive image conforming to the original formed on the NESA glass surface and a negative image formed on the roller surface.

In these examples, the particles are homogeneous, each made up of a single composition as follows:

Example I.—Locarno Red X–1686, 1-(4'-methyl-5'-chloroazobenzene-2'-sulfonic acid)-2-hydroxy-3-naphthoic acid, C.I. No. 15865, available from American Cyanamide;

Example II.—Watching Red B, a barium salt of 1-(4'-methyl-5'-chloroazobenzene-2'-sulfonic acid)-2-hydroxy-3-naphthoic acid, C.I. No. 15865, available from E. I. du Pont de Nemours & Co.;

Example III.—Permagen Red L Toner 51–500, 1-(4'-methyl-5'-chloroazobenzene-2'-sulfonic acid)-2-hydroxy-3-naphthoic acid, C.I. No. 15865, available from Collway Colors;

Example IV.—Naphthol Red B, 1-(2'-methoxy-5'-nitrophenylazo)-2-hydroxy-3''-nitro-3-naphthanilide, C.I. No. 12355, available from Collway Colors;

Example V.—Duol Carmen, the calcium lake of 1-(4'-methylazobenzene-2'-sulfonic acid)-2-hydroxy-3-naphthoic acid, C.I. No. 15850, available from E. I. du Pont de Nemours & Co.;

Example VI.—Bonadur Red B, an insolubilized azo dye available from Collway Colors. This pigment is a dye described in C.I. No. 15865 with hydrogen substituted for the sodium in the compound to insolubilize it.

Example VII.—Calcium Lithol Red, the calcium lake of 1-(2'-azonaphthalene-1'-sulfonic acid)-2-naphthol, C.I. No. 15630, available from Collway Colors.

Example VIII.—Indofast Double Scarlet Toner, a pyranthrone-type pigment, available from Harmon Colors. This pigment is a polynuclear aromatic having the following structure:

Example IX.—Quindo magenta RV–6803, a quinacridone-type pigment, available from Harmon Colors, having the following structure:

Example X.—Indofast Brilliant Scarlet Toner, 3,4,9,10 - bis[N,N'-(p-methoxyphenyl)-imido]-perylene, C.I. No. 71140, available from Harmon Colors.

Example XI.—Indofast Red MV–6606, a thioindoxyl-type pigment, available from Harmon Colors, having the following structure: (dichlorothioindigo)

Example XII.—Vulcan Fast Red BBE Toner 35–2201, 3,3'-dimethoxy-4,4'-biphenyl-bis (1''-phenyl-3'' - methyl-4''-azo-2'''-pyrazolin-5'''-one), C.I. No. 21200, available from Collway Colors.

Example XIII.—Pyrazolone Red B Toner, C.I. No. 21120, available from Collway Colors, having the following structure:

Exampl XIV.—Cyan Blue GTNF, the beta form of copper phthalocyanine, C.I. No. 74160, available from Collway Colors.

Example XV.—Cyan Blue XR, the alpha form of copper phthalocyanine, available from Collway Colors.

Example XVI.—Monolite Fast Blue GS, the alpha form of metal-free phthalocyanine, C.I. No. 74100, available from Arnold Hoffman Company.

Example XVII.—Monolite Fast Blue GS with about 3 mol percent 2,4,7-trinitro-9-fluorenone added to the suspension.

Example XVIII.—Monolite Fast Blue GS with about 2 mol percent benzonitrile added to the suspension.

Example XIX.—Monolite Fast Blue GS treated by milling in o-dichlorobenzene.

Example XX.—Methyl Violet, a phosphotungstomolybdic acid lake of 4-(N,N',N'-trimethylanilino) methylene-N'',N''-dimethylanilinium chloride, C.I. No. 42535, available from Collway Colors.

Example XXI.—Indofast Violet Lake, dichloro-9,18-isoviolanthrone, C.I. No. 60010, available from Harmon Colors.

Example XXII.—Diane Blue, 3,3' - methoxy-4,4'-diphenyl-bis (1'' - azo-2''-hydroxy-3''-naphthanilide), C.I. No. 21180, available from Harmon Colors.

Example XXIII.—A polychloro substituted copper phthalocyanine, C.I. No. 74260, available from Imperial Color and Chemical Company.

Example XXIV.—Indanthrene Brilliant Orange RK, 4,10-dibromo-6,12-anthanthrone, C.I. No. 59300, available from General Dyestuffs.

Example XXV.—Algol Yellow GC, 1,2,5,6-di(C,C'-diphenyl)-thiazole-anthraquinone, C.I. No. 67300, available from General Dyestuffs.

Example XXVI.—Algol Yellow GC, with the addition of about 2 mol percent 2,4,7-trinitro-9-fluorenone to the suspension.

Example XXVII.—Indofast Yellow Toner, flavanthrone, C.I. No. 70600, available from Harmon Colors.

Example XXVIII.—Indofast Orange Toner, a benzimidazole-type pigment, C.I. No. 71105, available from Harmon Colors.

Example XXIX.—Light Cadmium Orange Concentrate, a cadmium selenide pigment, C.I. No. 77196, available from Imperial Color and Chemical Company.

Example XXX.—1 - cyano-2,3-phthaloyl-7,8-benzopyrrocoline, prepared as described on page 1215 of the Mar. 5, 1957, issue of the Journal of the American Chemical Society.

The relative spectral sensitivity of the above listed materials and the sign of the potential applied to the blocking electrode core are tabulated in Table 1 below.

TABLE 1

| Example | Roller Electrode Polarity | Blue | Green | Red | White |
|---|---|---|---|---|---|
| I | Positive | 2 | 8 | 0 | 32 |
|  | Negative | 2 | 8 | 0 | 32 |
| II | Positive | 1 | 4 | 0 | 32 |
| III | Positive | 8 | 32 | 0 | 64 |
|  | Negative | 8 | 32 | 0 | 64 |
| IV | Positive | 1 | 4 | 0 | 16 |
| V | do | 4 | 16 | 1 | 64 |
| VI | do | 2 | 8 | 2 | 64 |
| VII | do | 1 | 4 | 0 | 16 |
| VIII | do | 4 | 8 | 0 | 32 |
| IX | do | 2 | 16 | 0 | 128 |
| X | do | 32 | 64 | 0 | 128 |
| XI | do | 2 | 8 | 0 | 32 |
| XII | Positive | 16 | 32 | 0 | 64 |
|  | Negative | 8 | 12 | 0 | 32 |
| XIII | Positive | 0 | 2 | 0 | 4 |
|  | Negative | 1 | 4 | 0 | 16 |
| XIV | Positive | 1 | 1 | 16 | 32 |
| XV | do | 1 | 4 | 16 | 32 |
| XVI | do | 1 | 8 | 32 | 64 |
| XVII | do | 2 | 16 | 64 | 128 |
| XVIII | do | 4 | 32 | 128 | 256 |
| XIX | do | 1 | 4 | 32 | 64 |
| XX | do | 0 | 1 | 1 | 8 |
| XXI | do | 0 | 8 | 0 | 32 |
| XXII | do | 0 | 1 | 8 | 16 |
| XXIII | do | 0 | 0 | 16 | 32 |
| XXIV | Negative | 4 | 16 | 0 | 32 |
| XXV | Positive | 2 | 0 | 0 | 8 |
| XXVI | do | 32 | 8 | 0 | 128 |
| XXVII | do | 16 | 4 | 0 | 64 |
| XXVIII | do | 0 | 8 | 16 | 32 |
| XXIX | Negative | 80 | 0 | 20 | 160 |
| XXX | do | 16 | 8 | 0 | 16 |

Example XXXI

A suspension including equal amounts of Watchung Red B, as described in Example II, Monolite Fast Blue GS, as described in Example XVI, and the yellow pigment of Example XXX in Sohio solvent is made up with the total pigment constituting about 8% by weight of the suspension. These pigments are magenta, cyan and yellow, respectively. This mixture, which shall be referred to as a "tri-mix" hereinafter, is coated on an NESA glass substrate and exposed under the same conditions as described above in connection with Examples I–XXX except for the fact that a Kodachrome transparency is placed between the white light source and the NESA glass substrate so that a colored image is projected onto this tri-mix as the roller moves across the surface of the NESA glass substrate. Here again, a baryta paper blocking electrode is employed and the roller core is held at a negative potential of about 2500 volts with respect to the NESA substrate. The roller is passed over the substrate 6 times and is cleaned after each pass. After completion of the 6 passes, it is found that an excellent quality full-color image with all colors well separated is left behind on the NESA substrate. Potential application and exposure are both continued during the entire period of the 6 passes by the roller.

Example XXXII

A suspension including equal amounts of Watchung Red B, Algol Yellow GC, and Monolite Fast Blue GS, in Sohio Odorless Solvent 3440 is made up with total pigment constituting approximately 7% by weight. These pigments are magenta, yellow and cyan respectively. This mixture is coated on an NESA substrate and exposed under the same conditions as described above in connection with Examples I–XXX except for the fact that a Kodachrome transparency is placed between the white light source and the NESA substrate so that a colored image is projected onto this tri-mix as the roller moves across the surface of the NESA substrate. Here again, a baryta paper blocking electrode is employed and the roller is held at a negative potential of 2500 volts with respect to the substrate. When the roller has passed over the surface of the substrate, it is found that a subtractive color image is left behind on the surface of the substrate. When this experiment is repeated employing cellophane in place of the baryta, a high quality color image is again produced.

Example XXXIII

The procedure of Example XXVII is repeated except that 2 mol percent of 2,4,7-trinitro-9-fluorenone is added to the tri-mix, giving approximately a four times increase in photographic speed to the system.

Examples XXXIV–XXXIX

Six different pigment tri-mix suspensions are made up, each including equal amounts of three different pigments in Sohio Odorless Solvent 3440 as described above with the total pigment constituting about 7 wt. percent of the suspension.

In Example XXXIV, the tri-mix is made up of Duol Carmine, as described above in Example V, Algol Yellow, as described above in Example XXV, and Monolite Fast Blue, as described above in Example XVI.

In Example XXXV, the tri-mix is made up of Watchung Red B, as described in Example II, Monolite Fast Blue GS, as described in Example XVI, and Velvaglow Fluorescent pigment, available from Radiant Color Company.

In Example XXXVI, the tri-mix is made up of Monolite Fast Blue GS, as described in Example XVI, Lemon Cadmium Yellow, C.I. No. 77196, a cadmium sulfide pigment, available from Imperial Color and Chemical Company, and Watchung Red B, as described in Example II.

The tri-mix of Example XXXVII is made up of Monolite Fast Blue GS, as described in Example XVI, Indofast Yellow Toner, as described in Example XXVII, and Watchung Red B, as described in Example II.

The tri-mix of Example XXXVIII is made up of Cyan Blue Toner GTNF, as described in Example XIV, Algol Yellow, as described in Example XXV, and Watchung Red B, as described in Example II.

The tri-mix of Example XXXIX is made up of Indofast Yellow Toner, as described in Example XXVII, Cyan Blue Toner, as described in Example XIV, and Watchung Red B, as described in Example II.

Each of these six tri-mixes is tested for imaging capabilities according to the technique described in Example XXXII and found to produce a good quality color image.

Example XL

A tri-mix suspension is made up including equal amounts of Watchung Red B, as described in Example II, Monolite Fast Blue GS, as described in Example XVI and the Yellow pigment of Example XXX in Isopar G with total pigment making up about 8% by weight of the suspension. The suspension is then tested according to the method of Example XXXII and found to produce a color image with all colors well separated.

Examples XLI–XLIII

In each of the following examples, a suspension including equal amounts of two differently colored pigments is made up in Sohio Odorless Solvent 3440 with the total pigment constituting about 6% by weight of the suspension.

In Example XLI, the pigments are Algol Yellow and Cyan Blue.

In Example XLII, the pigments are Watchung Red B and Cyan Blue Toner GTNF.

In Example XLIII, the pigments are Watchung Red B and Monolite Fast Blue GS.

The three two-pigment suspensions included yellow-cyan, magenta-cyan, and magenta-cyan pigments respectively and when they are exposed to two and three-color images containing blue and red, green and red, and green and red, respectively, according to the technique of Example XXXII, they are found to produce two-color images of the blue and red, green and red, and green and red portions of the original images on the upper roller of the imaging apparatus.

Although specific components and proportions have been described in the above examples, other materials, as listed above, may be used with similar results, where suitable. In addition, other materials may be added to the electrically photosensitive particles, to the imaging suspension, or to either electrode to synergize, enhance, or otherwise modify their properties. For example, the pigment compositions of this invention may be dye-sensitized or electrically sensitized if desired, or may be mixed with other photosensitive materials, both organic and inorganic.

Other modifications and ramifications of the present invention will occur to those skilled in the art upon a reading of the present disclosure. These are intended to be included within the scope of this invention.

What is claimed is:

1. A composition of matter for photoelectrophoretic imaging comprising a plurality of at least two differently colored finely divided particles in an insulating carrier liquid, each of said particles comprising an electrically photosensitive pigment which is both the primary electrically photosensitive ingredient and the primary colorant for said particle, and whose principal light absorption band coincides with its principal photosensitive response.

2. The composition of claim 1 further including a binder dissolved in said carrier liquid.

3. The composition of claim 1 further including from about 3 to about 6 parts paraffin for each 100 parts carrier liquid.

4. The composition of claim 1 wherein said carrier liquid is a saturated hydrocarbon liquid.

5. The composition of claim 1 wherein said insulating carrier liquid is a molten wax.

6. The composition of claim 1 containing from about 2 to about 10 parts by weight electrically photosensitive particles for each 100 parts carrier liquid.

7. The composition of claim 1 comprising from about 5 to about 6 parts electrically photosensitive particles for each 100 parts carrier liquid.

8. A composition of matter for photoelectrophoretic imaging comprising a plurality of finely divided particles in a substantially insulating carrier liquid, each of said particles comprising an electrically photosensitive pigment which is both the primary electrically photosensitive ingredient and the primary colorant for said particles, said suspension including cyan colored particles which are principally photosensitive to red light, magenta colored particles which are principally photosensitive to green light, and yellow colored particles which are principally photosensitive to blue light.

9. The composition of claim 8 further including a binder dissolved in said carrier liquid.

10. The composition of claim 8 further including from about 3 to about 6 parts paraffin for each 100 parts carrier liquid.

11. The composition of claim 8 wherein said carrier liquid is a saturated hydrocarbon liquid.

12. The composition of claim 8 wherein said insulating carrier liquid is a molten wax.

13. The composition of claim 8 containing from about 2 to about 10 parts by weight electrically photosensitive particles for each 100 parts carrier liquid.

14. The composition of claim 8 comprising from about 5 to about 6 parts electrically photosensitive particles for each 100 parts carrier liquid.

References Cited

UNITED STATES PATENTS

| | | | |
|---|---|---|---|
| 2,758,939 | 8/1956 | Sugarman | 96—1.4 X |
| 2,839,400 | 6/1958 | Moncrieff-Yeates | 96—1.4 |
| 2,940,847 | 6/1960 | Kaprelian | 96—1 |
| 3,058,914 | 10/1962 | Metcalfe et al. | 252—62.1 |
| 3,145,156 | 8/1964 | Oster | 204—180 |
| 3,301,772 | 1/1967 | Viro | 204—2 |

NORMAN G. TORCHIN, *Primary Examiner.*

V. E. VAN HORN, *Assistant Examiner.*